United States Patent
Arnold et al.

(10) Patent No.: US 8,297,422 B2
(45) Date of Patent: Oct. 30, 2012

(54) MULTIPLE CLUTCH DEVICE

(75) Inventors: Johannes Arnold, Achern (DE); Oliver Noehl, Buehlertal (DE); Ivo Agner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/185,694

(22) Filed: Jul. 19, 2011

(65) Prior Publication Data
US 2011/0290610 A1 Dec. 1, 2011

Related U.S. Application Data

(63) Continuation of application No. PCT/DE2009/001809, filed on Dec. 22, 2009.

(30) Foreign Application Priority Data

Jan. 19, 2009 (DE) .......................... 10 2009 005 075
Mar. 9, 2009 (DE) .......................... 10 2009 012 207

(51) Int. Cl.
F16D 25/10 (2006.01)
F16F 15/10 (2006.01)

(52) U.S. Cl. ............. 192/48.603; 192/48.619; 192/48.8; 192/70.17; 192/110 B; 192/115

(58) Field of Classification Search ............. 192/48.603, 192/48.619, 48.8, 115
See application file for complete search history.

(56) References Cited

U.S. PATENT DOCUMENTS

| | | | | |
|---|---|---|---|---|
| 6,634,477 B2 * | 10/2003 | Beneton et al. | ............. | 192/48.8 |
| 7,287,634 B2 * | 10/2007 | Agner et al. | ............. | 192/48.603 |
| 7,493,997 B2 * | 2/2009 | Meinhard et al. | ........... | 192/30 V |
| 2009/0223769 A1 * | 9/2009 | Nohl et al. | ................... | 192/48.8 |

FOREIGN PATENT DOCUMENTS

| | | |
|---|---|---|
| DE | 103 01 405 A1 | 7/2004 |
| DE | 10 2006 049 731 A1 | 5/2007 |
| DE | 10 2006 010 707 A1 | 9/2007 |
| EP | 1 226 992 A1 | 7/2002 |
| EP | 1 548 313 A2 | 6/2005 |
| EP | 1744074 A2 * | 1/2007 |

* cited by examiner

Primary Examiner — Richard M. Lorence
(74) Attorney, Agent, or Firm — Lucas & Mercanti, LLP; Klaus P. Stoffel

(57) ABSTRACT

A multiple clutch device which includes a drive unit, a downstream transmission connected to a drive shaft of the drive unit and accommodated in a clutch bell that does not co-rotate with the drive shaft, two wet multi-plate clutches, which include a plate support at the input and output end and plates alternating axially, and an actuation mechanism. A housing of the actuation mechanism is supported on the clutch bell, and the plate support at the input end of at least one of the multiplate clutches is connected to the housing by a supporting metal sheet or a supporting pot and a footstep bearing such that a flow of an actuation force generated by the actuation mechanism is redirected to the housing of the actuation mechanism via the supporting metal sheet or the supporting pot and the footstep bearing, thus creating a closed force flow within the device.

14 Claims, 5 Drawing Sheets

MULTIPLE CLUTCH DEVICE

This application is a continuation of PCT/DE2009/001809 filed Dec. 22, 2009, which in turn claims the priority of DE 10 2009 005 075.2 filed Jan. 19, 2009, and DE 10 2009 012 207.9 filed Mar. 9, 2009. The priority of these applications is hereby claimed and these application are incorporated by reference herein.

FIELD OF THE INVENTION

The present invention relates to a multiple clutch device for a drive train with a drive unit and with a following transmission, which device is connected to a drive shaft of the drive unit and is received in a bell-shaped clutch casing not corotating with the drive shaft of the drive unit, with two multi-plate clutches which have in each case an input-side and output-side plate carrier and plates alternating in the axial direction, and with an actuating device.

BACKGROUND OF THE INVENTION

A dual clutch device of this type is known from DE 10 2006 049 731. In this dual clutch, an actuating force generated by the actuating device has to be supported via the input-side plate carrier, a supporting bearing and a clutch cover tied fixedly to the bell-shaped clutch casing. For this purpose, the input-side plate carrier, supporting bearing and clutch cover must have correspondingly high dimensioning, the respective actuating force depending on the torque to be transmitted. With a rising torque, a correspondingly higher actuating force and correspondingly high dimensioning, in particular, of the clutch cover are accordingly necessary.

SUMMARY OF THE INVENTION

An object of the present invention is to specify a multiple clutch device of the type initially mentioned, with improved support of an actuating force. This object is achieved, according to the invention, by means of a multiple clutch device having the features of patent claim 1. Preferred exemplary embodiments of this multiple clutch device are the subject matter of the dependent patent claims.

At the present time, for energy efficiency reasons, attempts are made to reduce an overall number of cylinders of internal combustion engines, in particular 2-cylinder or 3-cylinder engines being developed. However, with a reduced number of cylinders, there is an increase in unsteady running of the drive units. With an increase in unsteady running of the drive units, the torsional vibration dampers, such as, for example, two-mass flywheels, also have to be redimensioned, thereby increasing the axial construction space requirement of the dual clutch.

An object of the present invention is to specify a multiple clutch device with improved support of a actuating force. A further object of the present invention is to specify a multiple clutch device with improved vibration damping, along with a construction space requirement which is not appreciably changed.

The objects are achieved by the present invention, which broadly relates to a multiple clutch device for a drive train which has a drive unit with a drive shaft and a following transmission. The device is connectable to the drive shaft of the drive unit. The device comprises a bell-shaped clutch casing, which is not corotatable with the drive shaft of the drive unit. The device is received in the bell-shaped clutch casing. Also, the device comprises an actuating device which has a housing supported radially on the bell-shaped clutch casing, a support sheet or a support pot and a supporting bearing which are arranged so as to connect the input-side plate carrier of at least one of the multi-plate clutches to the housing of the actuating device such that a force flux of an actuating force generated by the actuating device is returned to the housing of the actuating device by the support sheet or the support pot and the supporting bearing, so that the force flux, which is closed within the multiple clutch device, is present.

In one embodiment, the multi-plate clutches are arranged radially one above the other, and the input-side plate carrier of the radially outer multi-plate clutch is supported radially rotatably, and axially fixedly, on the housing of the actuating device via the support sheet or the support pot so that the force flux of the actuating force generated by the actuating device is supported on the housing of the actuating device via the axially fixed support of the radially outer input-side plate carrier and a force flux closed within the clutch device is present.

In another embodiment, the multi-plate clutches, which include a radially inner multi-clutch plate and a radially outer multi-clutch plate, are arranged radially one above the other and the input-side plate carrier of the radially inner multi-plate clutch is supported on the input-side plate carrier of the radially outer multi-plate clutch via a connection sheet or a connection pot.

In a further embodiment, the multi-plate clutches are arranged radially one above the other and the input-side plate carrier of the radially outer multi-plate clutch is connectable rotatably fixedly to an output side of a two-mass flywheel and/or to a torsional vibration absorber.

In yet another embodiment, the input-side plate carrier of the radially outer multi-plate clutch is a clutch pot has a clutch hub, on which an output hub of the two-mass flywheel is arranged rotatably fixedly, and the clutch pot is supportable radially on a transmission input shaft.

In an even further embodiment, the multiple clutch device includes a clutch cover, which is supported on the bell-shaped clutch casing. The output-side plate carriers of the multi-plate clutches and the input-side plate carrier of the radially outer multi-plate clutch are preloaded against the clutch cover.

In another embodiment, the device includes a corrugated spring arranged so as to preload the output-side plate carriers of the multi-plate clutches and the input-side plate carrier of the radially outer multi-plate clutch against the clutch cover.

In a further embodiment, the input-side plate carrier of the radially outer multi-plate clutch is a substantially cylindrical toothing sheet which is connectable to an output flange of the two-mass flywheel and to the support sheet or the support pot.

In yet another embodiment, the output-side plate carriers of the multi-plate clutches and the input-side plate carrier of the radially outer multi-plate clutch are preloadable against a primary-side sheet of the two-mass flywheel.

In an even further embodiment, the device includes a corrugated spring arranged so as to preload the output-side plate carriers of the multi-plate clutches and the input-side plate carrier of the radially outer multi-plate clutch against a primary-side sheet of the two-mass flywheel.

In another embodiment, the actuating device for each of the multi-plate clutches has a dedicated actuating unit which comprises an actuating bearing and a force transmission device. The force transmission device comprises a pressure pot, a lever spring and a pressure piece. The pressure pot is operatively connected to the actuating bearing, the pressure piece is operatively connected to the plates of an associated multi-plate clutch, and the lever spring is suspended on an input-side plate carrier of the associated multi-plate clutch and is operatively connected to the pressure pot and the pressure piece.

In a further embodiment, the multi-plate clutches are open in a non-actuated state and closed in an actuated state.

In an additional embodiment, the actuating unit of the actuating device generates a pressure force as actuating force, which is supported on the housing of the actuating device by the support sheet or the support pot, which acts as a tension pot.

In yet another embodiment, the two multi-plate clutches are wet-running multi-plate clutches, and the multiple clutch device further comprises a centrifugal pendulum, which is arrangeable parallel to a two-mass flywheel, on the input-side plate carrier of the at least one of the multi-plate clutches.

BRIEF DESCRIPTION OF THE DRAWINGS

The present invention is explained in more detail below by means of preferred exemplary embodiments in conjunction with the accompanying figures in which.

DETAILED DESCRIPTION OF THE INVENTION

Figure 1:
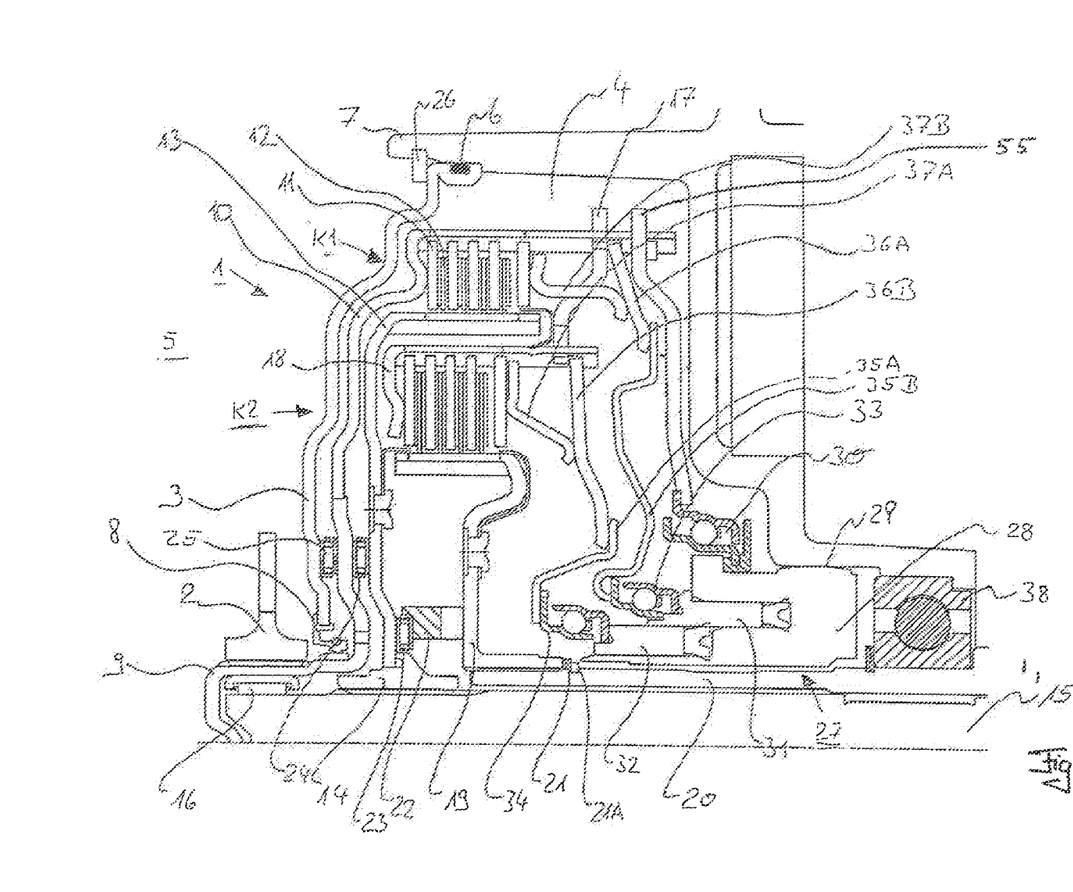
FIG. 1 shows a half section through a dual clutch according to a first exemplary embodiment.
Figure 2:
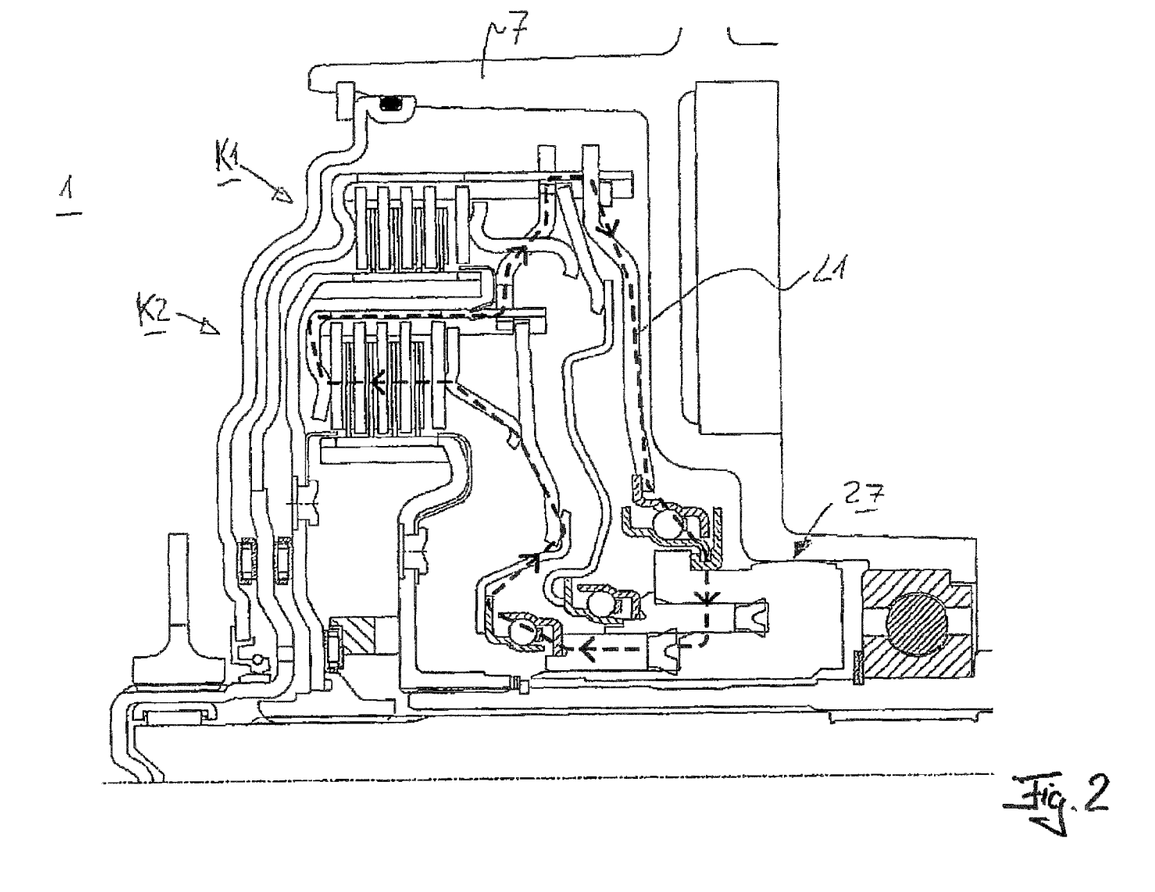
FIG. 2 shows a diagrammatical illustration of the internal force flux of the radially inwardly arranged multi-plate clutch K2 during its actuation for the dual clutch according to FIG. 1.

FIG. 1 shows a dual clutch 1 composed of two radially nested wet-running multi-plate clutches K1 and K2. Clutch K1 is in this case arranged radially on the outside and clutch K2 radially on the inside. The dual clutch 1 is driven by an output hub 2 of a two-mass flywheel (not shown in detail) preceding the clutch 1.

Between this two-mass flywheel and the dual clutch 1 is located a clutch cover 3 which separates a wet space 4 from a dry space 5. Static sealing 6 of the clutch cover 3 with respect to a transmission housing 7 of a transmission (not shown in detail) following in the drive train takes place preferably via an O-ring 6 or another static sealing element.

Sealing with respect to the dual clutch 1 takes place preferably via a radial shaft sealing ring 8 as a dynamic sealing element.

The output hub 2 of the two-mass flywheel (also designated below briefly as ZMS) is connected fixedly in terms of rotation to a clutch hub 9 via a toothing. The clutch hub 9 is connected to the input-side plate carrier 10 of the clutch K1 arranged on the outside in the radial nesting. The input-side plate carrier 10 of the multi-plate clutch K1 and the clutch hub 9 connected fixedly to said plate carrier are supported radially on the first transmission input shaft 15 (which is designed as a solid shaft) via a radial bearing 16. The input-side plate carrier 10 comprises toothing regions, on which input-side plates of the plate stack of the multi-plate clutch K1 are suspended, so that the input-side plates 11 are arranged fixedly in terms of rotation and so as to be axially displaceable. The input-side plates 11 are arranged alternately with output-side plates 12, and the input-side plates 11 and the alternately arranged output-side plates 12 together forming the plate stack of the clutch K1. The output-side plates 12 are connected to an output-side plate carrier 13 of the outer multi-plate clutch K1 fixedly in terms of rotation and so as to be axially displaceable. The output-side plate carrier 13 of the multi-plate clutch K1 comprises a hub 14 which is connected to a first transmission input shaft 15 of a dual clutch transmission, not shown in detail.

The input-side plate carrier 10 of the outer multi-plate clutch K1 is connected to the input-side plate carrier 18 of the radially inwardly arranged multi-plate clutch K2 via the connection sheet 17 which is suspended on the toothing region of the plate carrier 10. The input-side plates of the radially inwardly arranged multi-plate clutch K2 are suspended in a toothing region fixedly in terms of rotation and so as to be axially displaceable. The input-side plates of the radially inwardly arranged clutch K2 are arranged alternately with output-side plates which are arranged on an output-side plate carrier 19 of the multi-plate clutch K2 fixedly in terms of rotation and so as to be axially displaceable. The output-side plate carrier 19 has a hub region, at which the output-side plate carrier 19 is connected to a second transmission input shaft 20 (which is designed as a hollow shaft).

The output-side plate carrier 19 of the radially inwardly arranged multi-plate clutch K2 is pressed via a corrugated spring 21 (and, if necessary by virtue of construction, also via a connection piece 22), with a hearing 23 interposed, against the output-side plate carrier 13 of the radially outwardly arranged multi-plate clutch K1. The output-side plate carrier 13 of the radially outwardly arranged multi-plate clutch K1 is in turn pressed, with the further bearing 24 interposed, against the input-side plate carrier 10 of the radially outwardly arranged multi-plate clutch K1. The input-side plate carrier 10 of the radially outwardly arranged multi-plate clutch K1 is in turn pressed, with a further bearing 25 interposed, against the clutch cover 3 which is supported on the housing 7 of the transmission via the securing element 26. As can be gathered particularly from FIG. 1, the bearings 23, 24, 25 are preferably designed as axial (needle) bearings.

In the present case, the transmission input shafts 15, 20 are arranged coaxially and so as to be nested one in the other, the outer transmission input shaft 20 being supported in the housing 7 via a supporting bearing 38, and the inner transmission input shaft 15 being supported in the outer hollow shaft 20 via a mounting.

The dual clutch 1 comprises, furthermore, an actuating device 27 which is designed as a central clutch disengager for both multi-plate clutches K1 and K2, with a housing 28 which is supported on the housing 7 of the transmission via a bearing block 29. The actuating device 27, designed in the present case as a double annular piston engager (also designated as a dual CSC, CSC standing for "concentric slave cylinder"), comprises two annular pistons 31, 32 arranged concentrically to one another. The variant of the actuating device 27, as illustrated in FIGS. 1 to 4, shows an embodiment in which the two annular pistons 31, 32 slide one on the other. The inside diameter of the outer piston 31 of the clutch K1 therefore at the same time constitutes the sealing surface for the inner piston of the clutch K2. Alternatively (but not shown), an embodiment is also conceivable in which the two pistons are separated from one another by an annular web on which the seals can slide. Such an alternative embodiment makes it possible to rule out completely a situation where the pistons 31, 32 are influenced mutually by the seal. However, the possible embodiments of the actuating device 27 which were described above are to be understood purely as examples. Thus, instead of an annular piston, another cross-sectional form and/or a plurality of individual pistons, distributed along the circumference, may also be provided. An electrical disengager may likewise be provided instead of the piston/cylinder units. Moreover, mechanical actuating devices, in particular lever-actuated devices, could also be provided. In the present case, the piston seals of the annular pistons 31, 32 are designed as elastomeric seals which are connected to the respective pistons via positive connections. What may be considered a positive connection is, for example, a conical groove which is located in the piston and into which a corresponding tongue of the elastomeric seal is fitted. Alternatively, inserted seals made, for example, from PTFE or elastomeric seals injection molded directly onto the pistons may also be envisaged. The annular pistons 31, 32 are received by the engagement housing 28, bores in the engager housing 28, which are not shown in detail in the figures, serving for actuating the pistons via pressure oil.

In addition, the engager housing 28 assumes the radial positioning of the pistons via the bearing block within the bell-shaped clutch casing.

Each of the actuating units of the actuating device 27 is connected via an actuating bearing 33, 34 to a force transmission device, by means of which the respective actuating force is transmitted to the respective multi-plate clutch K1, K2. In the present case, each of the force transmission devices comprises a pressure pot 35A, 35B which bears against the respective bearing 33, 34. It may be noted in this case that, of course, each pressure pot has an elasticity which leads to a certain spring action. However, as regards the present actuating forces of the dual clutch, the pressure pots may be assumed to be "essentially rigid."

Moreover, each of the force transmission devices comprises a lever spring 36A, 36B which bears against the respective pressure pot 35A, 35B. The lever springs 36A, 36B are in each case suspended on the associated plate carrier of the corresponding multi-plate clutch K1, K2, this suspension point forming the respective center of rotation for the lever spring. A force step-up of the actuating forces generated by the actuating units takes place via the lever ratio of this lever spring.

Moreover, each of the force transmission devices comprises a pressure piece 37A, 37B which bears against the associated lever spring 36A, 36B and is operatively connected to the plates of the plate stacks of the respective multi-plate clutch K1, K2. The pressure pieces transmit the actuating forces to the plate stacks of the multi-plate clutches K1 and K2.

The pressure pieces 37A, 37B are suspended axially displaceably in a radially outer region into the toothing of the respective input-side plate carrier and are centered in the radial direction by the toothing.

Arranged on the housing 28 of the actuating device 27, in an outer surface area region, is a supporting bearing 30 which is connected via a tension pot 55 to the input-side plate carrier 10 of the radially outer multi-plate clutch K1. In this case, the inner ring of the supporting bearing is supported, via a collar formed on the housing 28, on the housing, on the one hand, and the outer ring of the supporting bearing, on the other hand, is supported on the tension pot 55 in such a way that an actuating force returned from the input-side plate carrier 10 of the multi-plate clutch K1 can be transmitted to the housing 28. The supporting bearing 30, which returns the actuating force to the engager housing 28, together with the tension pot 55, is preferably connected to the engager housing 28 via a bayonet connection.

When pressure acts upon one of the pistons or on both pistons, this moves or these move in the direction of the crankshaft (arranged on the left of the output hub of the ZMS in FIG. 1) and at the same time, via the drive of the associated pressure pot 35A, 35B, actuates or actuate the respective lever spring 36A, 36B which, in turn, introduces the actuating force into the plate stack via the associated pressure piece 37A, 37B. In the case of the radially inwardly arranged clutch K2, the actuating force is transmitted via the input plate carrier 18 and the connection piece 17 (also designated as a connection sheet) between input-side plate carriers of the radially inwardly arranged multi-plate clutch K2 and the input-side plate carrier 10 of the radially outwardly arranged multi-plate clutch K1. The input-side plate carrier 10, in turn, transmits the actuating force to the tension pot 55 which is connected to the engager housing 28 via the supporting bearing 30.

In the case of the radially outwardly arranged clutch K1, the introduced actuating force is returned directly via the input plate carrier 10 to the tension pot 55 and consequently via the supporting bearing 30 to the engager housing 28.

The present dual CSC therefore generates a pressure force acting on the pressure pots in the direction of the drive unit, a correspondingly high and oppositely directed counterforce being generated in the housing 28, and the actuating force being returned again via the tension pot and the supporting bearing in the same amount and with the same direction to the housing, so that the actuating force and the counterforce cancel one another in the housing. Since the supporting bearing 30 transmits the actuating force to the engager housing 28, the internal force flux within the clutch 1 is therefore closed. This run of the actuating force for actuating the multi-plate clutch K2 is illustrated diagrammatically in FIG. 2 by the dashed line L1. In the present case, therefore, no external forces are freed for actuating the multi-plate clutches K1 and K2, and therefore the clutch 1 requires no support of the actuating force at the bell-shaped clutch casing or on the engine side.

The hydraulic medium (actuating module) is fed to the actuating device via fittings which are connected to the bell-shaped clutch casing.

The engager housing 28 has torque support within the bell-shaped clutch casing, so that bearing friction within the supporting bearing 30 cannot lead to rotation of the engager housing 28. The fittings for the feed of pressure may in this case be used as torque support. Alternatively, separate support via tenon or similar component which engages into the bottom of the bell-shaped clutch casing when the clutch is being mounted may also be provided.

Figure 3:
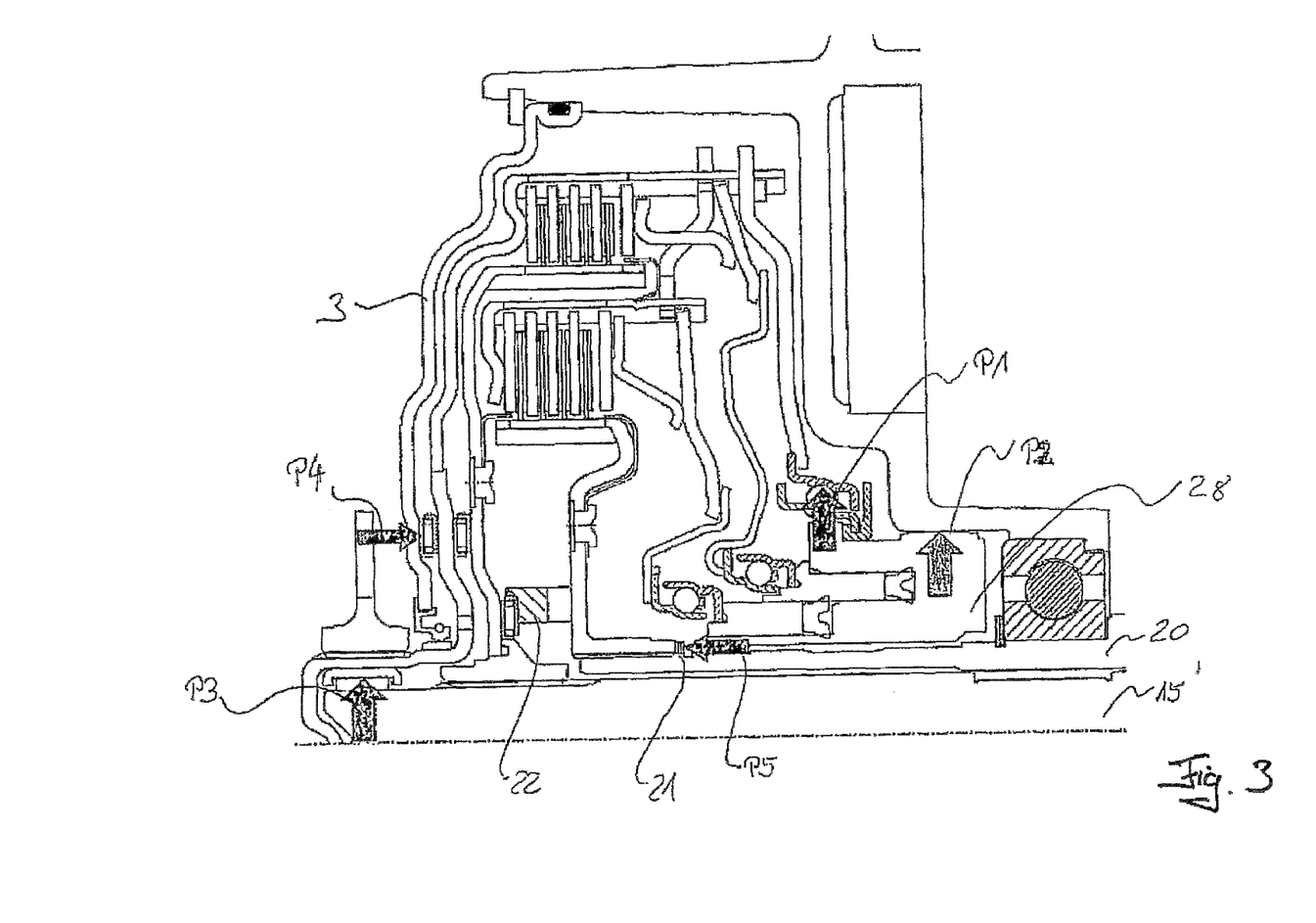
FIG. 3 shows a diagrammatic illustration of the mounting of the dual clutch according to FIG. 1 and FIG. 2.

FIG. 3 illustrates diagrammatically by arrows P1 to P5 the radial and axial mounting of the clutch 1 according to the exemplary embodiment shown in FIG. 1.

As seen in the radial direction, all the components of the dual clutch 1 which rotate at the rotational speed of the engine are mounted, on the transmission side, on the engager housing 28 and, on the engine side, on the solid shaft 15. Arrow P1 in this case represents the support of the input-side plate carrier 10 of the radially outwardly arranged multi-plate clutch K1 and of the components, connected to this component, on the engager housing 28. The engager housing 28, in turn, is supported on the bottom of the bell-shaped clutch casing (on the transmission housing) via the bearing block 29, as illustrated by the arrow P2. The bearing block 29 constitutes the angle compensation between the solid shaft 15 and the transmission-side bearing base. The solid shaft 15 supports on the engine side, via the bearing 16, the input-side plate carrier 10 of the radially outwardly arranged clutch K1, as illustrated by the arrow P3. The clutch components 14, 19 rotating with the respective transmission input rotational speeds of the solid and the hollow shaft 15, 20 are mounted radially via the hubs/hub regions seated on the shafts.

The bearing block 29 may be replaced by radial support on the outer transmission input shaft, preferably via a radial needle bearing arranged on the outer transmission input shaft.

As seen axially, the clutch 1 is supported on the clutch cover 3, the supporting force being applied by the corrugated spring 21. The axial mounting points are indicated by the arrows P4 and P5. In this case, the corrugated spring 21 is supported on a securing ring, attached to the hollow shaft 20, and the hub of the output-side plate carrier 19 of the multi-plate clutch K2. The output-side plate carrier 19 of the multi-plate clutch K2 conducts this axial force via a spacer disk 22 to an axial needle bearing 23 located on the output-side plate carrier 13 or its hub region 14. The output-side plate carrier 13 of the multi-plate clutch K1 is supported, in turn, via an axial needle bearing 24 on the input-side plate carrier 10 of the clutch K1, which plate carrier is supported on the clutch cover 3 via a further needle bearing 25. The clutch system 1 is therefore always aligned on the clutch cover 3. Axial vibrations and tolerances can be compensated via the corrugated spring 21. The axial needle bearings 23, 24, 25 may also be replaced by run-on disks. The above-described type of axial mounting of the present clutch 1 may also be used independently of the internally closed force flux described above, that is to say also in other types of actuating force flux, and constitutes a separately usable solution in general for dual (wet) clutches.

Figure 4:
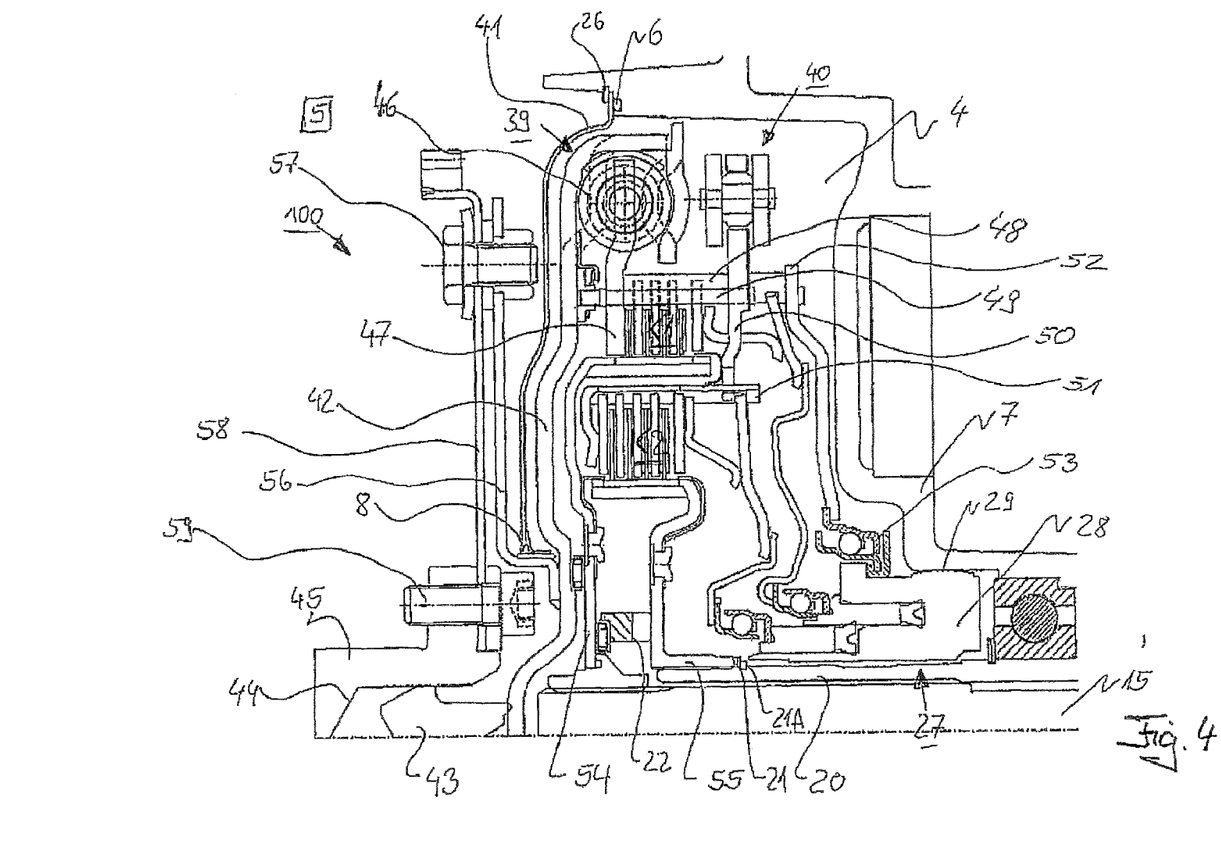
FIG. 4 shows a half section through the dual clutch according to a further exemplary embodiment in a play-free plate carrier.

FIG. 4 shows a further exemplary embodiment of the present multiple clutch device which corresponds completely in terms of the actuating force flux concept to the exemplary embodiments already explained above. Thus, all the features listed above regarding the actuating device are identical among the exemplary embodiments according to FIGS. 1 to 3 and according to FIG. 4. Furthermore, in the present case, a bearing block is provided once again in order to support the actuating housing 28 radially on the transmission housing 7 and compensate axial offset.

The exemplary embodiment according to FIG. 4 differs from the above exemplary embodiment, however, in the elements, ZMS and/or centrifugal pendulum, used for damping the rotational non-uniformities coming from the internal combustion engine.

Thus, in the exemplary embodiment according to FIG. 4, both the ZMS 39 and a centrifugal pendulum 40 are arranged in the bell-shaped clutch casing which is delimited with respect to a dry space by a clutch cover 41. In the present case, the clutch cover 41 is not provided for the axial mounting of the clutch. Instead, it constitutes only the separation between the wet space 4 and dry space 5 via the sealing devices 6 and 8.

The ZMS 39 comprises a primary-side ZMS sheet 42 which in the present case is of pot-like design and comprises, in its radially inner region, a pilot tenon 43 which engages into a recess 44 of the crankshaft 45 and centers the primary-side ZMS sheet. The primary-side ZMS sheet 42 has in its radially outer region pocket-shaped regions in which spring elements are received, the end regions, not in contact with these pockets, of the energy accumulators 46 being operatively connected to a secondary-side ZMS flange 47. The secondary-side ZMS flange 47 is connected via the rivets 49 to an essentially cylindrical toothing sheet 48, the toothing sheet 48 serving as the input-side plate carrier of the radially outwardly arranged clutch K1.

The input-side plate carrier 48 is connected via the connection sheet 50 to the input-side plate carrier 51 of the radially inwardly arranged multi-disk clutch K2. Moreover, this connection sheet 50 is connected (in the present case, formed in one piece) with the centrifugal pendulum 40, so that the ZMS 39 and the centrifugal pendulum 40 are jointly connected to the toothing sheet 48 (preferably via the rivets 49) and are correspondingly connected in parallel.

The toothing sheet 48 is connected via the tension pot 52 to the supporting bearing 53 which is arranged on the engager housing 28 (as already described above).

The output-side plate carrier 54 of the multi-plate clutch K1 is arranged fixedly in terms of rotation on the hollow shaft 15. The output-side plate carrier 55 of the multi-plate clutch K2 is arranged fixedly in terms of rotation on the hollow shaft 20. The output-side plate carrier 54 of the multi-plate clutch K2 is preloaded against the output-side plate carrier 54, with an axial bearing interposed, via the corrugated spring 21 in conjunction with the securing element 21A and the connection element 22. The output-side plate carrier 54 of the multi-plate clutch K1 is loaded against the primary-side ZMS flange 42 (also designated as "ZMS sheet"), with a further axial bearing interposed. A drive plate 56 is arranged fixedly on the primary-side ZMS sheet 42 and is connected to a Flexplate 58 via a screw connection 57, the Flexplate being connected to the crankshaft 45 via a further screw connection 59.

The actuating device 27 again comprises actuating units which in the present case are designed as piston/cylinder units which in each case act via the force transmission devices, composed of the pressure pot, lever spring and pressure piece, on the respective plate stacks of the multi-plate clutches K1 and K2, as already described above.

The clutch 100 according to FIG. 4 is therefore tied to the internal combustion engine via the Flexplate 58. The drive plate 56 and the primary-side ZMS sheet are connected to one another directly (preferably so as to be oil-tight) and receive the clutch cover 41, connected axially between them, with the radial shaft sealing ring 8.

The primary-side components of the ZMS are mounted directly on the crankshaft 45 via a pilot tenon 43.

The secondary-side flange 47 of the ZMS at the same time constitutes the end plate of the multi-plate clutch K1 in the present case.

The input-side plate carrier 48 of the multi-plate clutch K1 is designed as a riveted variant (as already described).

Figure 5:
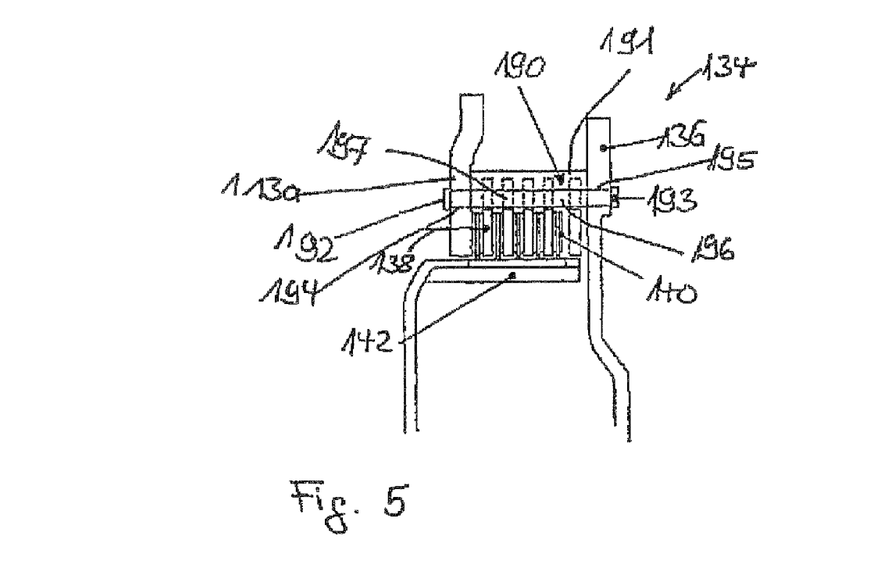
FIGS. 5 and 6 show diagrammatic illustrations relating to built-up plate carriers.
Figure 6:
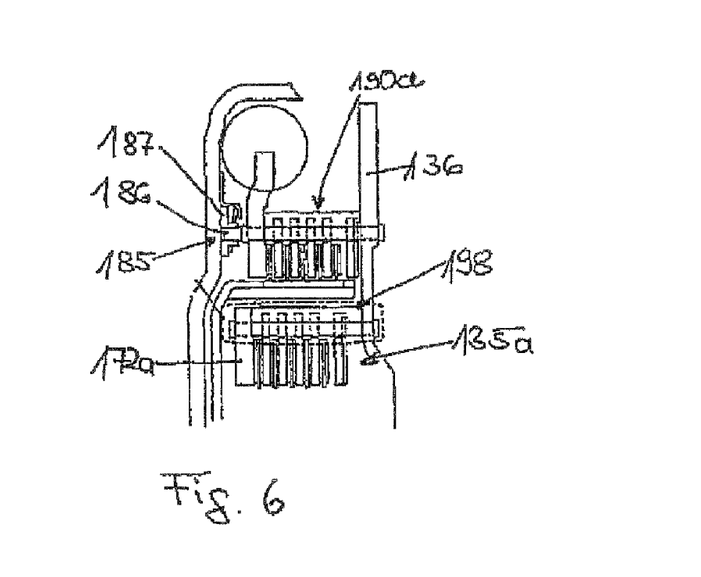

Exemplary embodiments of a riveted plate carrier are illustrated in FIGS. 5 and 6.

FIG. 5 shows a built-up plate carrier 134 (comparable to the input-side plate carrier of FIG. 4) in detail as a sectional illustration. The plate carrier 134 is formed from the flange part 113a, the carrier disk 136 and circumferentially distributed connection elements 190 arranged axially between them. In the exemplary embodiment shown, the connection elements 190 are formed from prebent sheet metal parts 191 which have axially extending rivet studs 192, 193 which are led through corresponding orifices 194, 195 in the flange part 113a or carrier disk 136 and are riveted against this from outside. The circumferentially pointing ends of the sheet metal parts 191 are chamfered or bent radially inward to form tooth flanks 196, so as to form, in the cross section of the sheet metal parts 191, a tooth flank profile on which the plates 138 are suspended, the latter having for this purpose a complementary outer profile 197, so that the plates 138 are centered on the plate carrier 134 and the torque prevailing at the plate carrier 134 is transmitted to the plates 138. The plates 138 are layered alternately with the friction plates 140 which are suspended in the output-side plate carrier 142 fixedly in terms of rotation and so as to be displaceable axially to a limited extent.

FIG. 6 shows a version alternative to the plate carrier described above, in the form of the plate carrier 135a in a built-up version. The plate carrier 135a has connection elements 198 which are designed comparably to the connection elements 190 of FIG. 5 and are riveted between the end plate 172a and the carrier disk 136. Further, FIG. 6 shows a connection element 190a with an axially prolonged pin 186, which connection element replaces the connection element 190 of FIG. 5, for example, in a plurality of circumferential positions and thereby enables the plate carrier 134 to engage with the friction device 185, in that the pins 186 drive the friction ring 187 in the circumferential direction with respect to the housing of the clutch unit and thus control the friction device.

In the exemplary embodiment shown in FIG. 4, the individual toothing sheets have two different lengths and are distributed alternately over the circumference. The shorter toothing sheets are riveted to the connection sheet 50 of the input-side plate carriers 48 and 51 of the multi-plate clutches K1 and K2. The longer toothing sheets are connected to the tension pot 52 which returns the actuating forces to the engager housing 28. What is achieved by these stepped toothing sheets is that the centrifugal pendulum is tied, free of rotational play, to the secondary-side flange of the ZMS. Consequently, the tension pot 52 is connected positively and non-positively to the input-side plate carrier 48 of the multi-plate clutch K1 and can absorb the actuating forces which occur.

List Of Reference Symbols

1 Clutch
2 Drive Hub
3 Clutch Cover
4 Wet Space
5 Dry Space
6 Lug Ring
7 Housing
8 Radial Shaft Sealing Ring
9 Clutch Hub
10 Plate Carrier
11 Plate
12 Plate
13 Plate Carrier
14 Hub
15 Transmission Input Shaft
16 Radial Bearing
17 Connection Sheet
18 Plate Carrier
19 Plate Carrier
20 Transmission Input Shaft
21 Corrugated Spring
22 Connection Piece
23 Bearing
24 Bearing
25 Bearing
26 Securing Element
27 Actuating Device
28 Housing
29 Bearing Block
30 Supporting Bearing
31 Piston
32 Piston
33 Actuating Bearing
34 Actuating Bearing
35A Pressure Pot
35B Pressure Pot
36A Lever Spring
36B Lever Spring
37A Pressure Piece
37B Pressure Piece
38 Supporting Bearing
39 ZMS
40 Centrifugal Pendulum
41 Clutch Cover
42 ZMS Sheet
43 Pilot Tenon
44 Recess
45 Crankshaft
46 Energy Accumulator
47 ZMS Flange
48 Toothing Sheet
49 Rivets
50 Connection Sheet
51 Input-Side Plate Carrier
52 Tension Pot
53 Supporting Bearing
54 Output-Side Plate Carrier
55 Tension Pot
56 Drive Plate
57 Screw Connection
58 Flexplate
59 Screw Connection
K1 Multi-Plate Clutches
K2 Multi-Plate Clutches

The invention claimed is:

1. A multiple clutch device for a drive train which has a drive unit with a drive shaft and a following transmission, the device comprising:
    a transmission housing, which is not corotatable with the drive shaft of the drive unit, the device being connectable to the drive shaft of the drive unit and received in the transmission housing;
    two multi-plate clutches each have an input-side plate carrier, an output-side plate carrier and plates alternating in an axial direction;
    an actuating device having a housing supported radially on the transmission housing via a bearing block; and
    a support sheet or a support pot and a supporting hearing arranged so as to connect the input-side plate carrier of at least one of the multi-plate clutches to the housing of the actuating device such that a force flux of an actuating force generated by the actuating device is returned to the housing of the actuating device by the support sheet or the support pot and the supporting hearing, so that the force flux, which is closed within the multiple clutch device, is present.

2. The multiple clutch device as claimed in claim 1, wherein the multi-plate clutches are arranged radially one above the other, and the input-side plate carrier of the radially outer multi-plate clutch is supported radially rotatably, and axially fixedly, on the housing of the actuating device via the support sheet or the support pot, so that the force flux of the actuating force generated by the actuating device is supported on the housing of the actuating device via the axially fixed support of the radially outer input-side plate carrier and a force flux closed within the clutch device is present.

3. The multiple clutch device as claimed in claim 2, wherein the multi-plate clutches are arranged radially one above the other, and the input-side plate carrier of the radially inner multi-plate clutch is supported on the input-side plate carrier of the radially outer multi-plate clutch via a connection sheet or a connection pot.

4. The multiple clutch device as claimed in claim 1, wherein the multi-plate clutches, which include a radially inner multi-clutch plate and a radially outer multi-clutch plate, are arranged radially one above the other, and the input-side plate carrier of the radially outer multi-plate clutch is connectable rotatably fixedly to an output side of a two-mass flywheel and/or to a torsional vibration absorber.

5. The multiple clutch device as claimed in claim 4, wherein the input-side plate carrier of the radially outer multi-plate clutch is connectable rotatably fixedly to the two-mass flywheel, and is a clutch pot having a clutch hub, on which an output hub of the two-mass flywheel is arranged rotatably fixedly, and the clutch pot is supportable radially on a transmission input shaft.

6. The multiple clutch device as claimed in claim 4, further comprising a clutch cover, which is supported on the bell-shaped clutch casing, the output-side plate carriers of the multi-plate clutches and the input-side plate carrier of the radially outer multi-plate clutch are preloaded against the clutch cover.

7. The multiple clutch device as claimed in claim 6, further comprising a corrugated spring arranged so as to preload the output-side plate carriers of the multi-plate clutches and the input-side plate carrier of the radially outer multi plate clutch against the clutch cover.

8. The multiple clutch device as claimed in claim 4, wherein the input-side plate carrier of the radially outer multi-plate clutch is connectable rotatably fixedly to the two-mass flywheel, and is a substantially cylindrical toothing sheet which is connectable to an output flange of the two-mass flywheel and to the support sheet or the support pot.

9. The multiple clutch device as claimed in claim 4, wherein the input-side plate carrier of the radially outer multi-plate clutch is connectable rotatably fixedly to the two-mass flywheel, and wherein the output-side plate carriers of the multi-plate clutches and the input-side plate carrier of the radially outer multi-plate clutch are preloadable against a primary-side sheet of the two-mass flywheel.

10. The multiple clutch device as claimed in claim 4, wherein the input-side carrier of the radially outer multi-plate clutch is connectable rotatably fixedly to the two-mass flywheel, further comprising a corrugated spring arranged so as to preload the output-side plate carriers of the multi-plate clutches and the input-side plate carrier of the radially outer multi-plate clutch against a primary-side sheet of the two-mass flywheel.

11. The multiple clutch device as claimed in claim 1, wherein the actuating device for each of the multi-plate clutches has a dedicated actuating unit which comprises an actuating bearing and a force transmission device, the force transmission device comprising a pressure pot, a lever spring and a pressure piece, the pressure pot being operatively connected to the actuating bearing and the pressure piece being operatively connected to the plates of an associated one of the multi-plate clutches, and the lever spring being suspended on an input-side plate carrier of the associated multi-plate clutch and being operatively connected to the pressure pot and the pressure piece.

12. The multiple clutch device as claimed in claim 11, wherein the actuating unit of the actuating device generates a pressure force as an actuating force which is supported on the housing of the actuating device by the support sheet or the support pot, which acts as a tension pot.

13. The multiple clutch device as claimed in claim 1, wherein the multi-plate clutches are open in a non-actuated state and closed in an actuated state.

14. The multiple clutch device as claimed in claim 1, wherein the two multi-plate clutches are wet-running multi-plate clutches, and the multiple clutch device further comprises a centrifugal pendulum, which is arrangeable parallel to a two-mass flywheel, on the input-side plate carrier of one of the multi-plate clutches.

\* \* \* \* \*